US012762175B2

(12) United States Patent
Speirs

(10) Patent No.: US 12,762,175 B2
(45) Date of Patent: Oct. 13, 2026

(54) AUTOMATED EXHAUST DATA CLASSIFICATION

(71) Applicant: MICROSOFT TECHNOLOGY LICENSING, LLC, Redmond, WA (US)

(72) Inventor: David Speirs, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 19/092,707

(22) Filed: Mar. 27, 2025

(65) Prior Publication Data

US 2026/0300368 A1 Oct. 1, 2026

(51) Int. Cl.

*G06F 16/35* (2025.01)
*G06F 16/353* (2025.01)
*G06F 16/38* (2019.01)

(52) U.S. Cl.

CPC ............ *G06F 16/353* (2019.01); *G06F 16/38* (2019.01)

(58) Field of Classification Search

CPC ............................... G06F 16/353; G06F 16/38
See application file for complete search history.

(56) References Cited

U.S. PATENT DOCUMENTS

2021/0004404 A1* 1/2021 Debique ............. G06F 16/9535
2024/0070270 A1* 2/2024 Mace .................... G06F 21/552
2024/0273282 A1* 8/2024 Muralidharan ....... G06F 40/166
2025/0117863 A1* 4/2025 Zangrilli ................. G06F 40/40
2025/0200635 A1* 6/2025 Unnikrishnan ......... G06F 40/40

* cited by examiner

*Primary Examiner* — Cindy Nguyen
(74) *Attorney, Agent, or Firm* — Newport IP, LLC; Jacob P. Rohwer

(57) ABSTRACT

The techniques presented herein provide a system for implementing automated exhaust data categorization. In general, exhaust data is a trail of data left by the activities of a computer system during regular activity, behavior, and/or transactions. As such, the amount and/or variety of exhaust data for a given can oftentimes be greater than the associated primary data. Consequently, analyzing exhaust data across an entire organization (e.g., a company) can be overwhelming for many automated tools, much less a manual approach. To that end, the present system streamlines the process of organizing and analyzing exhaust data through a customizable exhaust data retrieval query and a well-defined language model input structure. In various examples, the query is targeted to a specific timeframe, organization, data type, and so forth. Likewise, the language model input structure utilizes prompt engineering to leverage the powerful data processing capabilities of modern language models while minimizing inconsistencies.

20 Claims, 7 Drawing Sheets

Change Type 426

Developer Type 424

| | Accessibility Improvements | Bug/Defect Fix | Maintenance and Technical Debt Reduction | New Features | UI/UX Changes |
|---|---|---|---|---|---|
| Back-End Developer | N/A | 17 | 10 | 16 | N/A |
| Front-End Developer | 11 | 41 | 22 | 77 | 63 |
| Desktop Developer | 1 | 80 | 47 | 37 | 1 |
| Mobile App Developer | 2 | 12 | 7 | 32 | 41 |
| Web Developer | 1 | 24 | 31 | 35 | 11 |

Multidimensional Output 422

FIG. 4B

AUTOMATED EXHAUST DATA CLASSIFICATION

BACKGROUND

As modern organizations (e.g., companies, educational institutions, hobbyist groups) grow in size and/or scope, many take advantage of online tools that enable large groups of individuals to collaborate regardless of time or place. In one example, a software development organization can utilize distributed version control system such as git to collectively manage a software code repository. In another example, a group of writers utilize a cloud-based storage and collaboration tool to work together on shared documents. Likewise, organizations can utilize other online tools for administrative management such as a human resources tool, a tool for collecting employee feedback, and so forth. Consequently, such tools produce vast amounts of administrative data over the course of normal operations. For instance, a version control tool may include data tracking an individual user's contributions to a given repository (e.g., commits, pull requests). In another example, a document collaboration tool includes data tracking a user's edits to a given document.

Generally referred to as exhaust data, this data comprises an electronic trail left by the activities of a computing system during regular activity, behavior, and/or transactions. One notable example of exhaust data is the cookies that are stored when a user visits a given website. These cookies form a well-defined browsing history that can be distilled into personal interests and leveraged to serve eerily relevant advertisements, suggestions, and other customized content. As such, an organization may seek to gain insight by organizing the exhaust data produced by its members in order to understand operations and make well-informed decisions. However, even a small number of individuals can produce large volumes of exhaust data that may overwhelm many automated processing tools, much less a manual analysis.

It is with respect to these and other considerations that the disclosure made herein is presented.

SUMMARY

The techniques presented herein provide a system for implementing automated exhaust data categorization. As mentioned above, exhaust data is a trail of data left by the activities of a computer system during regular activity, behavior, and/or transactions. Moreover, exhaust data is part of a broader category of unconventional data that includes geospatial, network, and time-series data and may be useful for predictive analytics. For example, a user's contribution to a software repository (i.e., the code written by the user), is accompanied by various pieces of exhaust data such as the title of an associated pull request, a description of said pull request, the names of files the user edited, the location of those files, and so forth.

In this way, the amount and/or variety of exhaust data can oftentimes be greater than the primary data. Consequently, organizing and/or analyzing exhaust data across an entire organization (e.g., a company, an educational institution) can be overwhelming for many automated tool much less a manual approach. Moreover, different types of exhaust data may be stored in varying locations which can further complicate the task of organization and/or analysis. To that end, the present system streamlines the process of organizing and analyzing exhaust data through two components.

Firstly, a well-defined exhaust data retrieval query that enables an operator to specify the exhaust data to retrieve according to the information they wish to analyze. For instance, a software engineering director may be interested in analyzing the distribution of engineering expertise and/or recent activity among their staff to inform future technical decisions, shape engineering teams, review performance and the like. Accordingly, one may edit the exhaust data retrieval query to specify a timeframe (e.g., the past 90 days) and an associated organization (e.g., team) for which to retrieve the exhaust data. For example, the aforementioned software engineering director may specify that exhaust data is to be retrieved for employees that report to them in accordance with an organizational chart.

In addition, the exhaust data retrieval query can specify what types of data to retrieve. For example, in a software engineering organization, the query can be configured to retrieve pull request data from any repositories that belong to the software engineering organization. In various examples, pull request data includes the names of files that were changed, the title of the pull request, the description of the pull request, the identity of the associated repository, and the like. However, it should be understood that while the examples described herein may relate specifically to a software engineering context, the query can be configured to retrieve any type of data.

Furthermore, the exhaust data retrieval query can also specify an output format for the retrieved exhaust data. For instance, returning to the example of pull request data, the output format can specify various fields included in the exhaust data such as an associated alias (e.g., user identifier), a title of the pull request, a repository associated with the pull request, and the like. Moreover, the output format can truncate the retrieved exhaust data if the amount of exhaust data associated with a given pull request exceeds a threshold amount. In a specific example, the query may specify a threshold of "250" for the names of files that were changed. Consequently, if a given pull request has "300" changed files, only the names of the first "250" are retrieved. In this way, the query ensures a representative sample while preventing excessive verbosity that may compromise downstream performance.

In various examples, the exhaust data retrieval query can be written in the Kusto Query Language (KQL). The Kusto Query Language specializes in querying telemetry, metrics, and logs which makes KQL a good choice for exhaust data retrieval operations. However, it should be understood that any suitable technology can be utilized to implement the exhaust data retrieval query. The exhaust data retrieval query is then read by a central management module which proceeds to execute the exhaust data retrieval operation across a plurality of exhaust data repositories. Generally described, the central management module parses the query and identifies the location(s) of relevant exhaust data (e.g., repositories). The central management module then queries these locations using the parameters specified in the query to retrieve the exhaust data.

The central management module then appends the exhaust data to a language model input structure, which forms the second component of the present system. Often referred to as a prompt, the language model input structure is an input to a language model (e.g., a small language model, a large language model, a multimodal language model) that causes the language model to perform a specified task. These inputs are typically in the form of a natural language instruction and/or statement (e.g., English). Generally described, a language model is a machine learning algorithm implementing a statistical representation of natural language. Accordingly, the language model is trained on large amounts of text data, image data, and/or other data to learn statistical relationships between individual tokens (e.g., words, characters, phrases). For instance, the language model can be trained to predict tokens in sequences of textual training data. Consequently, the language model achieves predictive capability with respect to vague and/or typically nebulous aspects inherent to natural language such as syntax, semantics, and ontologies. Subsequently, when employed in inference mode, the output of the language model can include new sequences of text that the model generates (e.g., a categorization output).

However, the outputs of language models is non-deterministic, meaning the language model can produce different outputs even when provided with the same input. As such, the language model input structure described herein is specifically configured to mitigate inconsistencies through prompt engineering. In general, prompt engineering is the process of structuring and/or crafting an instruction to ensure expected behavior in a language model. Prompt engineering may involve altering the phrasing, word selection, and/or grammar, as well as providing relevant context and/or specific instructions for the language model to follow. Accordingly, the language model input structure can include, firstly, a natural language description of the exhaust data categorization task (e.g., “For the following list of Pull Requests, categorize them into developer ‘types’ as a Primary Suggested Category.”). To supplement this description, the language model input structure can also include a plurality of predefined categories for the language model to select from. In this way, the language model input structure can prevent the language model from producing undefined and/or non-existent categories (e.g., a hallucination).

In addition, the language model input structure includes a definition of the exhaust data output format from the above-mentioned exhaust data retrieval query. In this way, the language model input structure enables the language model to recognize the values encoded by the fields present in the exhaust data. Furthermore, the language model input structure can define an output format comprising a specific schema to which the language model is to adhere. In a specific example, consider an exhaust data categorization task in which the language model is instructed to categorize individual software engineers into categories based on the technical expertise expressed in their pull requests. Accordingly, as will be discussed further below, the model output format can command the language model to “return exactly 1 row for each developer according to the following schema: Alias|Primary Suggested Category|Reasoning for Category selection(s)|Confidence Score (0-100)”. Moreover, the exhaust data categorization task specified by the language model input structure can be repeated (e.g., looped) until all of the retrieved exhaust data has been processed by the language model.

Subsequently, the central management module can receive a language model output that indicates a successful execution of the exhaust data categorization task. In various examples, the language model output is a text file comprising a plurality of exhaust data categorization outputs corresponding to the number of individual entities (e.g., pull requests, software engineers) to be classified in the exhaust data. The language model output can then be parsed and undergo further processing to extract insights that may have been unattainable through conventional means. For example, a first task may categorize all of the software engineers of a given organization into different types (e.g., front-end, back-end, full-stack, desktop, mobile) based on pull requests submitted within the past ninety days. Meanwhile, a second task may categorize pull requests submitted within the past ninety days into change types (e.g., bug fixes, maintenance and technical debt reduction, new features, user interface changes). Accordingly, the resulting output can be a multidimensional output that relates developer type to change type and enables one to easily glean insights from the exhaust data. For instance, a software engineering director may notice that a disproportionate number of desktop developers work on bug fixes and technical debt reduction. Consequently, the software engineering director can plan future initiatives and/or objectives around addressing the prevalence of bugs and/or other technical issues in their desktop products. In this way, the disclosed system enhances efficiency by extracting otherwise unattainable insights from large volumes of exhaust data.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term “techniques,” for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4B illustrates an example of a multidimensional output relating two categories resulting from an exhaust data categorization task.

DETAILED DESCRIPTION

The techniques presented herein provide a system for implementing automated exhaust data categorization. As mentioned above, exhaust data is a trail of data left by the activities of a computer system during regular activity, behavior, and/or transactions. Moreover, exhaust data is part of a broader category of unconventional data that includes geospatial, network, and time-series data and may be useful for predictive analytics. For example, a user's contribution to a software repository (e.g., the code written by the user), is accompanied by various pieces of exhaust data such as the title of an associated pull request, a description of said pull request, the names of files the user edited, the location of those files, and so forth. In this way, the amount and/or variety of exhaust data for a given can oftentimes be greater than the primary data.

Consequently, organizing and/or analyzing exhaust data across an entire organization (e.g., a company, an educational institution) can be overwhelming for many automated tools, much less a manual approach. Moreover, different types of exhaust data may be stored in varying locations which can further complicate the task of organization and/or analysis. To that end, the present system streamlines the process of organizing and analyzing exhaust data through a customizable exhaust data retrieval query and a well-defined language model input structure.

Various examples, scenarios, and aspects related to the techniques are described below with respect to FIGS. 1-6.

Figure 1:
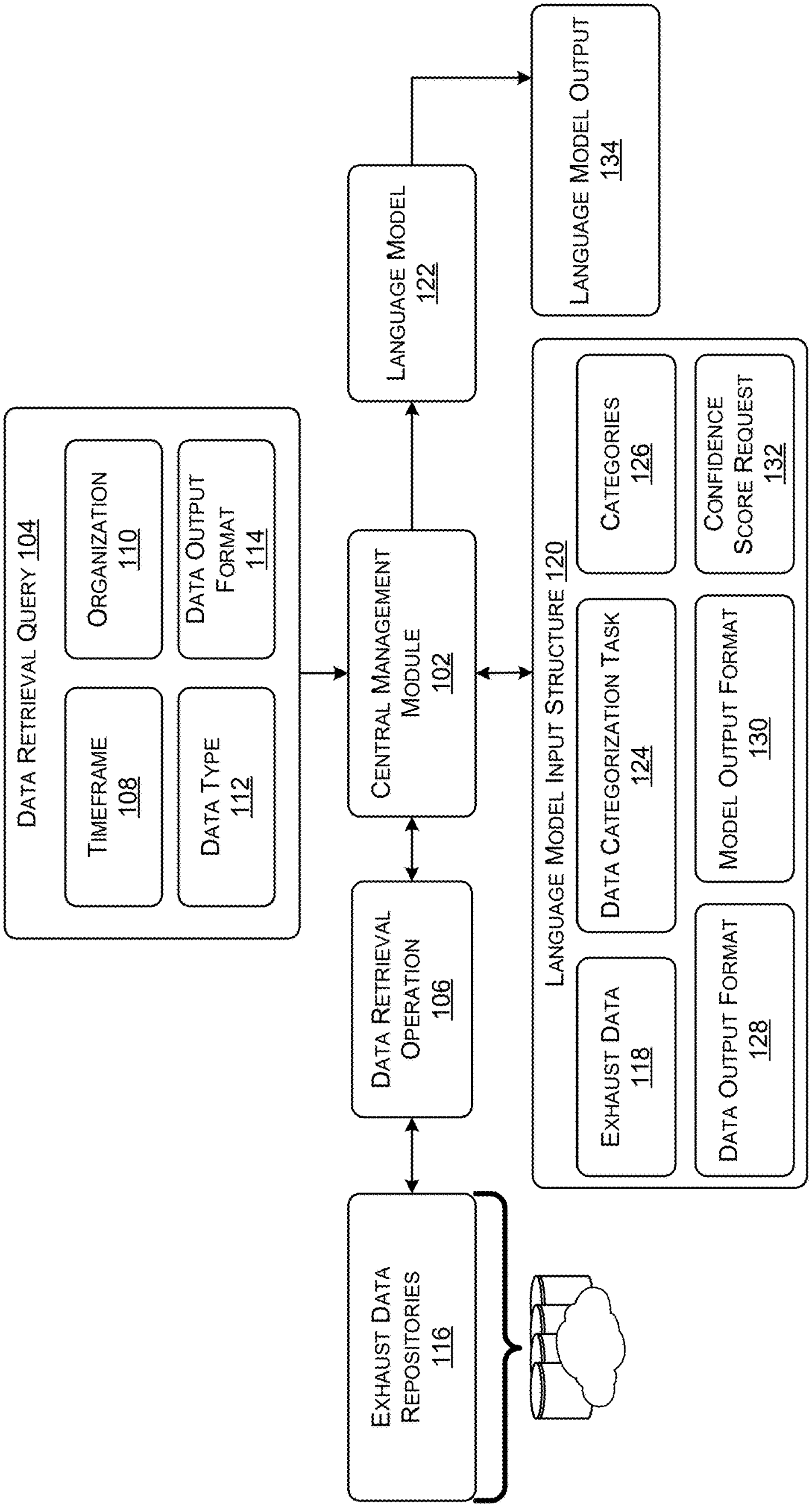
FIG. 1 is a block diagram of a system for implementing an exhaust data categorization task using a language model.

FIG. 1 illustrates a system for implementing an automated exhaust data classification task. In various examples, this process begins at a central management module 102 which reads in a data retrieval query 104 to execute a data retrieval operation 106. Generally described, the central management module 102 is a software application that is developed for overseeing the retrieval of exhaust data and the execution of the exhaust data classification task. In various examples, the exhaust data retrieval query 104 can be written in the Kusto Query Language (KQL). The Kusto Query Language specializes in querying telemetry, metrics, and logs which makes KQL a good choice for exhaust data retrieval operations. However, it should be understood that any suitable technology can be utilized to implement the exhaust data retrieval query 104.

As shown, the data retrieval query 104 includes a specific timeframe 108 for the data retrieval operation 106. For instance, a timeframe 108 of ninety days will cause the data retrieval operation 106 to retrieve exhaust data that was created within the past ninety days. The data retrieval query 104 also defines an organization 110 associated with the data retrieval operation 106. Generally described, the organization 110 defines a specific group of users whose exhaust data is to be retrieved. In a specific example, the data retrieval query 104 defines the organization 110 as an array of user identifiers based on a predefined organizational chart. Accordingly, data identifying the organization 110 can be retrieved by querying a human resources database.

Furthermore, the data retrieval query 104 defines a specific data type 112 and data output format 114 for the data retrieval operation 106. For example, in the context of a software engineering organization 110, the data type 112 can be related to pull requests in a software repository such as the names of files changed, file paths, pull requests titles, pull request descriptions, the name of the software repository, and so forth. Generally described, a pull request is a mechanism in version control systems such as git to propose changes in a software repository. In this way, pull requests enable a developer to notify their colleagues of new changes and request their approval to merge these changes into the main codebase. Likewise, the data output format 114 can be configured based on the data type 112. For instance, in the context of software pull requests, the data output format 114 can format strings of data (e.g., file names, file paths) as single comma delimited strings to enable easy parsing by downstream tools. In another example, the data output format 114 can truncate long strings of data (e.g., a list of file names, descriptions) to prevent verbosity that may lead to excessive latency and compromise the performance of downstream tools.

After reading in the data retrieval query 104, the central management module 102 executes the data retrieval operation 106 by querying a plurality of exhaust data repositories 116 in accordance with the parameters defined by the data retrieval query 104. For example, parameters defining the organization 110 can be processed at a human resource database to retrieve an organizational chart, user identifiers, and the like. The retrieved user identifiers can then be used to query various software repositories to retrieve data associated with the user identifiers that matches the data type 112 specified by the data retrieval query 104. Subsequently, the exhaust data retrieved by the data retrieval operation 106 is formatted in accordance with the data output format 114.

The central management module 102 then prepares the data for categorization by appending the exhaust data 118 to a language model input structure 120. As mentioned above, the language model input structure 120 is an input to a language model 122 (e.g., a small language model, a large language model, a multimodal language model) that causes the language model 122 to perform a specified task. In the present example, the language model input 120 commands the language model 122 to perform a data categorization task 124. In various examples, the data categorization task 124 is formatted as a natural language description (e.g., "For the following list of Pull Requests, categorize them into developer 'types' as a Primary Suggested Category.").

However, providing the description of the data categorization task 124 and the exhaust data 118 is insufficient to ensure a high-quality and/or consistent output. As mentioned above, due to the scale and complexity of the neural networks that comprise them, modern language models are non-deterministic, meaning that the language models may produce different outputs even when given the same input. As such, the language model input structure 120 is specifically configured to mitigate inconsistencies through prompt engineering. In general, prompt engineering is the process of structuring and/or crafting an instruction to ensure expected behavior in a language model. Prompt engineering may involve altering the phrasing, word selection, and/or grammar, as well as providing relevant context and/or specific instructions for the language model to follow.

For example, the language model input structure 120 includes a list of predefined categories 126 for the language model 122 to select from. In this way, the language model input structure 120 constrains the possible outputs of the language model 122. Moreover, the language model input structure 120 can prevent the language model from producing undefined and/or non-existent categories (e.g., a hallucination). In addition, the language model input structure 120 includes a data output format 128 that explains the format of the incoming exhaust data 118 which enables the language model 122 to easily parse the exhaust data 118.

In another example of prompt engineering, the language model input structure 120 includes a model output format 130 that defines how the language model 122 is to format its output. As will be elaborated upon further below, the model output format 130 can include specific fields that the model is to fill in based on its analysis of the exhaust data 118. In a specific example, returning to the context of software engineering and pull request data, the model output format 130 can command the language model 122 to "return exactly 1 row for each developer according to the following schema: Alias|Primary Suggested Category|Reasoning for Category selection(s)|Confidence Score (0-100)".

Finally, the language model input structure 120 can include a confidence score request 132. As will be described below, the confidence score request 132 instructs the language model 122 to score its selections for each execution of the data categorization task 124 by calculating a likelihood the selection is correct. Moreover, the confidence score request 132 can include a score range (e.g., 0-100) and natural language criteria for selecting a given confidence score (e.g., "to determine confidence score: 90-100: PR data has direct high confidence to description and technologies"). After configuring the language model input structure 120, the central management module 102 can then input the language model input structure 120 to the language model 122.

In response to receiving the language model input structure 120, the language model 122 produces a language model output 134 in accordance with the data categorization task 124, the predefined categories 126, the model output format 130, and/or the confidence score request 132 defined by the language model input structure 120. In various examples, the language model output 134 indicates a successful completion of the data categorization task 124. Moreover, the language model output 134 can be a text file comprising a plurality of categorization outputs with respect to the exhaust data 118 and the data categorization task 124. In a specific example, the associated data categorization task 124 commands the language model 122 to produce a categorization output for each individual developer present in the exhaust data 118, and the exhaust data 118 includes pull request data relating to one hundred developers, the language model output 134 text file will include one hundred individual outputs. In another example, a data categorization task 124 commands the language model 122 to categorize individual pull requests by change type. For a set of exhaust data 118 containing five hundred pull requests, the language model output 134 will include five hundred individual data categorization outputs.

Accordingly, the language model output 134 can be further processed and combined with other data such as human resources data, employee evaluations, and the like to develop multifaceted insights into the activity of the organization 110. In one example, as will be elaborated upon below, a review of the language model output 134 may show that a disproportionate number of desktop developers submit pull requests relating to bug fixes and/or technical debt reduction in comparison to other types of developers (e.g., mobile application developers, front-end developers). Accordingly, one can plan future technical objectives and/or initiatives directed to this aspect of desktop software development. In this way, the system illustrated in FIG. 1 enables users (e.g., engineering directors, managers) to gain otherwise unattainable insights into the activity of their organization 110 from large volumes of exhaust data 118 and assist in making well-informed technical decisions.

Figure 2:
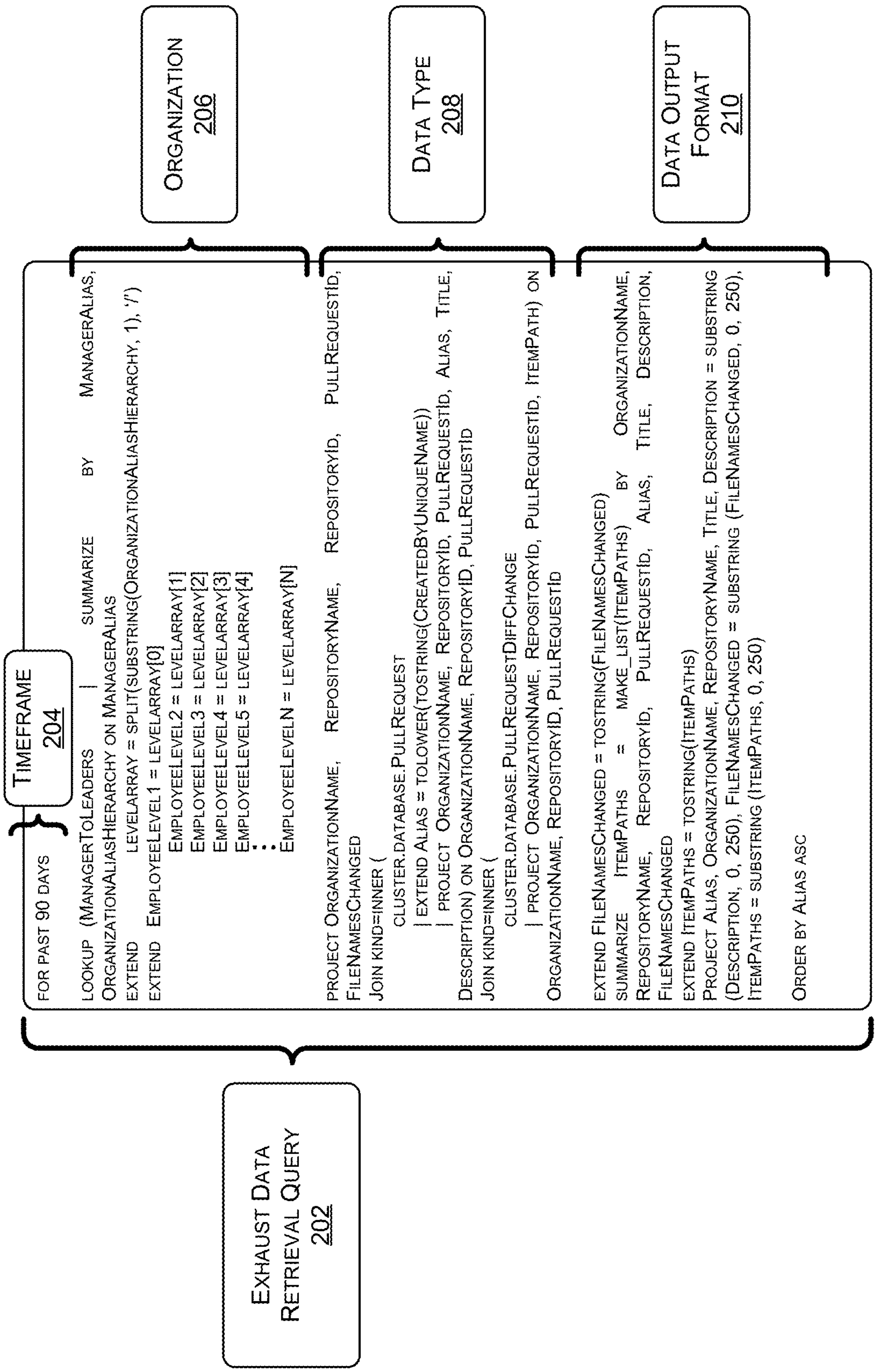
FIG. 2 illustrates an example of an exhaust data retrieval query.

Turning now to FIG. 2, aspects of an example exhaust data retrieval query 202 are shown and described. As discussed above, the exhaust data retrieval query 202 defines a plurality of parameters that configure an exhaust data retrieval operation. In various examples, the exhaust data retrieval query 202 is a read-only request to process data and return results that is formatted as a plain text file. In the example of FIG. 2, the exhaust data retrieval query 202 is written for retrieving exhaust data for a software engineering organization. However, it should be understood that exhaust data can be retrieved for any type of organization.

As shown, the exhaust data retrieval query 202 can define a specific timeframe 204. In this example, the timeframe 204 is the "past 90 days". That is, the timeframe 204 constrains the exhaust data retrieval operation to only retrieve exhaust data that has been generated within the last ninety days. In addition, the exhaust data retrieval query 202 defines an organization 206 whose exhaust data is to be retrieved. In various examples, the organization 206 is defined via an organizational chart that can be retrieved from a human resources database. For instance, in the present example, the organization 206 is defined via an Organization Alias Hierarchy comprising a plurality of Employee Level variables. In this way, the organization 206 parameter causes the exhaust data retrieval operation to retrieve exhaust data relating to users identified in a specific organizational chart.

Furthermore, the exhaust data retrieval query 202 defines a data type 208 to be retrieved by the exhaust data retrieval operation. As mentioned, the exhaust data retrieval query 202 is written for a software engineering organization 206. Accordingly, the data type 208 is directed to exhaust data associated with pull requests. Generally described, a pull request is a mechanism in version control systems such as git to propose changes in a software repository. In this way, pull requests enable a developer to notify their colleagues of new changes and request their approval to merge these changes into the main codebase. As shown, the data type 208 names specific types of data to be retrieved such as an organization name, a repository name, a repository ID, a pull request ID, a pull request title, a pull request description, a list of file names that were changed, and an associated alias (e.g., a user identifier). That is, the data type parameter 208 causes the exhaust data retrieval operation to target specific types of exhaust data associated with user identifiers named in the organization parameter 206.

In addition, the exhaust data retrieval query 202 defines a data output format 210 for the retrieved exhaust data. In one example, the data output format 210 converts a list into a single comma delimited string to enable a downstream language model to easily parse the exhaust data. In another example, the data output format 210 defines a threshold to truncate the retrieved exhaust data to prevent excessive verbosity which can lead to long latencies at the downstream language model. For instance, the illustrated data output format 210 formats the list of changed files (see, FileNamesChanged) as a single comma delimited string using a "tostring" function. Subsequently, the string comprising the list of changed files is truncated at "250" characters using a "substring" function. Finally, the formatted exhaust data is ordered according to the associated alias (e.g., user identifier) such that the downstream language model can work through the exhaust data on a per-user basis. In this way, the exhaust data retrieval query 202 enables (1) a high degree of specificity when retrieving exhaust data and (2) formatting for optimal performance when processing the exhaust data using a downstream tool such as a language model.

Figure 3:
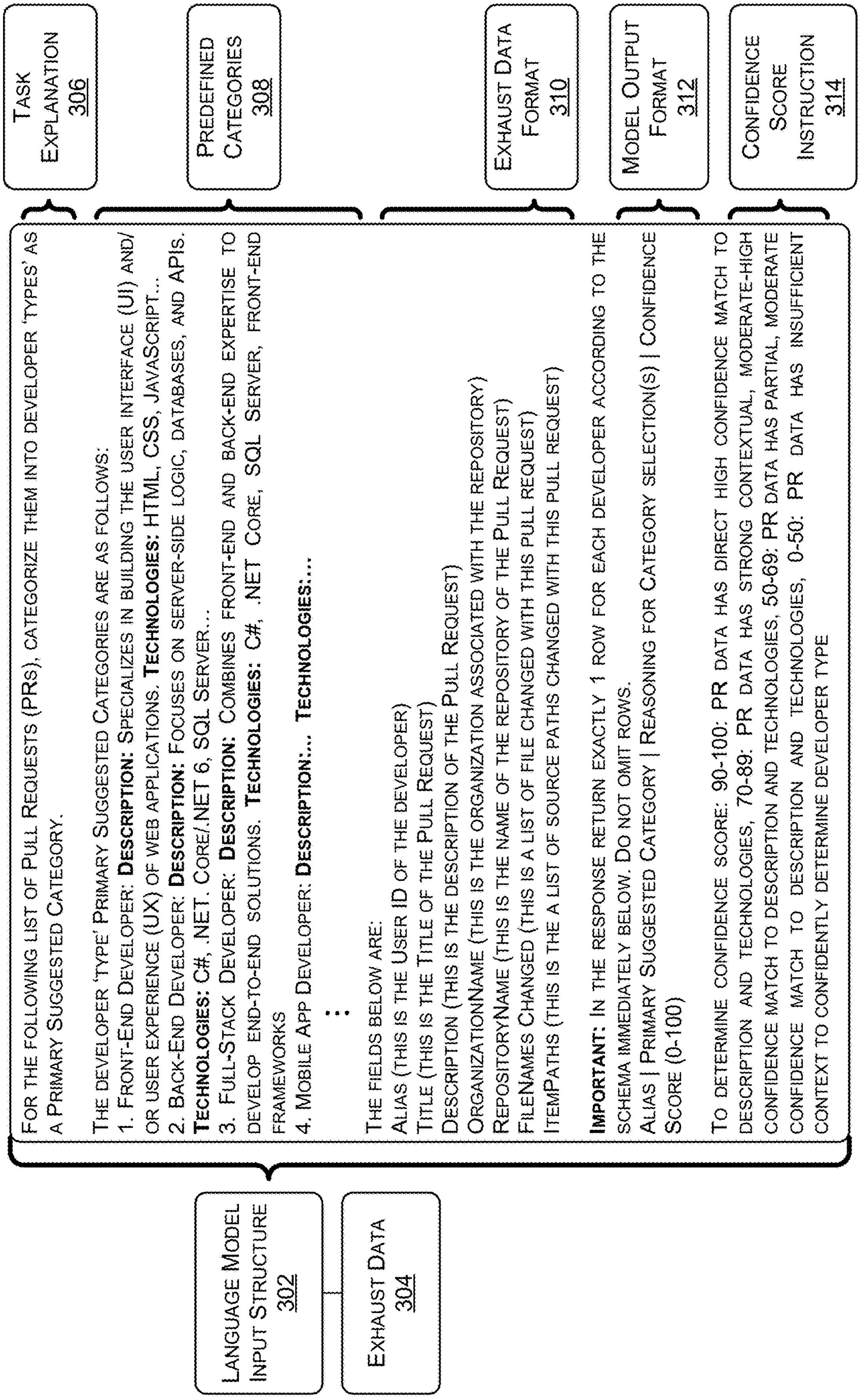
FIG. 3 illustrates an example of a language model input structure for executing an exhaust data categorization task.

Proceeding to FIG. 3, aspects of an example language model input structure 302 are shown and described. As shown, the language model input structure 302 includes an appended set of exhaust data 304. In various examples, the exhaust data 304 is retrieved from a plurality of exhaust data repositories via execution of an exhaust data retrieval query such as the example described above with respect to FIG. 2. Moreover, the exhaust data 304 can include structured data and unstructured data. That is, some of the exhaust data 304 may be highly organized and easily decipherable by machine learning algorithms (e.g., language models) while other portions of the exhaust data may be loosely organized and thus require special processing. Examples of structured data include names, dates, identification numbers, and the like. Examples of unstructured data include natural language text (e.g., a pull request description) and social media posts. As such, the diversity present in the exhaust data 304 represents a good fit for the capabilities of language models.

As described above, a language model is a machine learning algorithm implementing a statistical representation of natural language. Accordingly, the language model is trained on massive amounts of text data, image data, and/or other data to learn statistical relationships between individual tokens (e.g., words, characters, phrases). Consequently, the language model achieves predictive capability with respect to vague and/or typically nebulous aspects inherent to natural language such as syntax, semantics, and ontologies which makes the language model a strong candidate for analyzing large volumes of exhaust data. In various examples, the language model can be implemented as a neural network (e.g., a long short-term memory-based model, a decoder-based generative language model). Examples of decoder-based generative language models include versions of models such as GPT, BLOOM, PaLM, Mistral, Gemini, and/or LLaMA.

In addition, the language model input structure 302 includes a task explanation 306 comprising a natural language description of the exhaust data categorization task. Oftentimes referred to as a prompt, the task explanation 304 defines an expected behavior of the language model using a natural language instruction (e.g., "For the following list of Pull Requests (PRs), categorize them into developer 'types' as a Primary Suggested Category."). However, as mentioned above, modern language models are non-deterministic owing to the complexity of the large neural networks that comprise them. That is, a modern language model may produce different outputs even when given the same input. As such, the majority of the language model input structure 302 is specifically configured to mitigate inconsistencies through prompt engineering. Generally described, prompt engineering is the process of structuring and/or crafting an input to ensure expected behavior in a language model. Prompt engineering may involve altering the phrasing, word selection, and/or grammar, as well as providing relevant context and/or specific instructions for the language model to follow.

For example, the language model input structure 302 includes a plurality of predefined categories 308 that constrain the language model to one of several predefined choices. In this way, the predefined categories 308 prevent the language model from producing undefined and/or nonexistent categories (e.g., a hallucination). In the present example, the predefined categories 308 are directed different types of software developers (e.g., a front-end developer, a back-end developer, a full-stack developer). As shown, each of the predefined categories 308 includes a description of the category as well as technologies associated with the category. For instance, the description of the "front-end developer" category specifies that front-end developers "specialize in building the user interface (UI) and/or user experience (UX) of web applications." Technologies associated with front-end developers include hypertext markup language (HTML), cascading style sheets (CSS), and JavaScript. It should be noted that the illustrated examples are presented for the sake of discussion and are not exhaustive. Moreover, it should be understood that the language model input structure 302 can include any number and/or type of predefined categories 308.

The language model input structure 302 also includes an explanation of the exhaust data format 310. As described above with respect to FIG. 2, the exhaust data 304 is formatted in a specific manner for processing by a language model. Accordingly, the explanation of the exhaust data format 310 enables the language model to effectively parse the exhaust data 304 with respect to specified fields. That is, the exhaust data format 310 explicitly defines each section of the exhaust data 304 to the language model to limit the potential for incorrect outputs.

Likewise, the language model input structure 302 defines a model output format 312 that includes an unambiguously worded instruction (e.g., "return exactly 1 row for each developer"). The model output format 312 also includes a strictly defined schema comprising a plurality of fields (e.g., "Alias|Primary Suggested Category|Reasoning for Category selection(s)|Confidence Score (0-100)"). In the present example, the language model input structure 302 is directed to categorizing individual developers according to the technical expertise demonstrated in their recent work (e.g., pull requests over the past ninety days) hence the specific fields defined in the model output format 312. However, it should be understood that similar to the predefined categories 308, the model output format 312 can define any number and/or type of output field.

Finally, the language model input structure 302 includes a confidence score instruction 314 that directs the language model to assign a confidence score to each categorization output (e.g., each developer, each pull request). Generally described, the confidence score quantifies a likelihood that the associated primary suggested category is correct. In this way, an operator reviewing the language model outputs can quickly identify categorizations that do not satisfy a threshold confidence score (e.g., 90) and flag and/or otherwise correct the categorization. In this way, the language model input structure 302 ensures consistent, high-quality output from the language model via the task explanation 306, the predefined categories 308, the exhaust data format 310, and the model output format 312 while also providing a mechanism for manual review and/or override via the confidence score instruction 314.

Figure 4A:
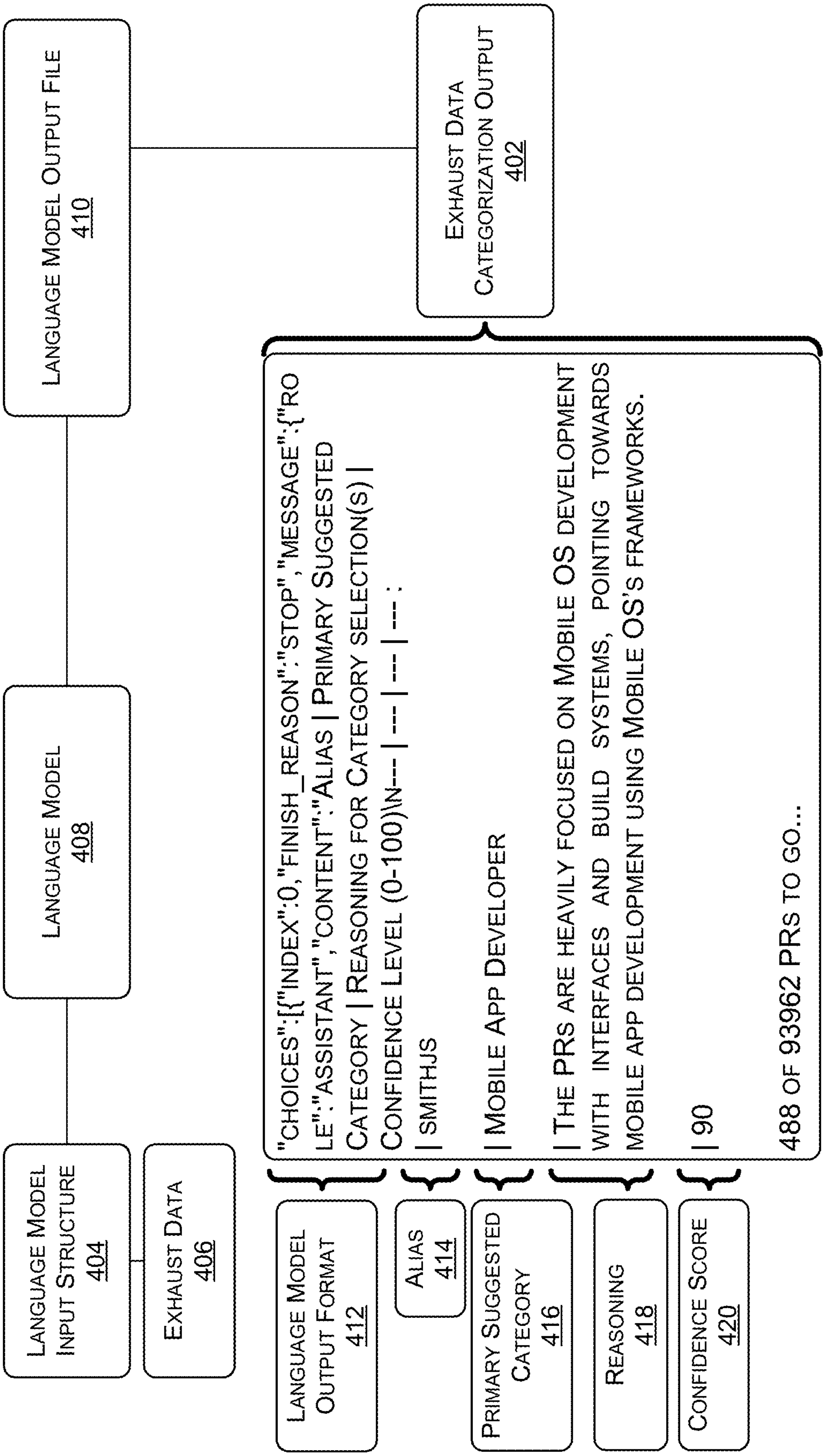
FIG. 4A illustrates an example of an individual exhaust data categorization output.

Turning now to FIG. 4A, aspects of an example of exhaust data categorization output 402 are shown and described. As discussed in the above examples, a language model input structure 404 with appended exhaust data 406 is input to a language model 408. In response, the language model executes an exhaust data categorization task defined by the language model input structure 404 and produces a language model output file 410. In various examples, the language model output file 410 is a text file containing a plurality of categorization outputs. In the present example, an individual exhaust data categorization output 402 is shown.

In accordance with the model output format described above, the exhaust data categorization output 402 conforms to a language model output format 412 that define a plurality of fields including an alias 414 (e.g., a user identifier), a primary suggested category 416, a reasoning 418 associated with the primary suggested category 416, and a confidence score 420. As shown, the alias 414 being categorized in the exhaust data categorization output 402 is one "smithjs" whom the language model 408 has assigned the "Mobile App Developer" primary suggested category 416. To support the selection of the "Mobile App Developer" primary suggested category 416, the language model 408 produces a natural language reasoning 418 stating that "the PRs are heavily focused on Mobile OS development with interfaces and build systems, pointing towards mobile app development using Mobile OS's frameworks." With a confidence score 420 of "90" the exhaust data categorization output 402 indicates a high likelihood that the user identified by the alias 414 is best characterized as a "Mobile App Developer". It should be understood that the example exhaust data categorization output 402 illustrated in FIG. 4A is formatted for legibility and that any suitable format can be utilized.

Proceeding to FIG. 4B, aspects of an example multidimensional output 422 are shown and described. As discussed above, an exhaust data categorization task can command a language model to categorize a set of exhaust data in accordance with a plurality of predefined categories. In one example, the exhaust data categorization task may be to categorize individual software developers into various developer types 424 (e.g., a back-end developer, a front-end developer). In another example, the exhaust data categorization task may be to categorize a plurality of pull requests into various change types 426.

In various examples, the categorization into developer types 424 and the categorization into change types 426 can be executed as two separate tasks (e.g., two different language model input structures). Conversely, the categorization into developer types 424 and the categorization into change types 426 may be executed via a single, larger task (e.g., one language model input structure) that includes a first plurality of predefined categories (e.g., the developer types 424) and a second plurality of predefined categories (e.g., the change types 426). It should be understood that any suitable configuration of language model input structure can be utilized to obtain the categorization data of the multidimensional output 422.

Irrespective of the configuration of the categorization task or tasks, the multidimensional output 422 can be generated by collating language model output data and indexing the output data according to the sets of predefined categories (e.g., the developer types 424 and the change types 426). Consequently, the multidimensional output 422 enables a user (e.g., an engineering director, a technical manager) to gain granular insights into the exhaust data of a given organization. As shown, the multidimensional output 422 can be rendered as a heat map where greater concentrations of activity (e.g., a high number of pull requests) are shown with progressively darker shading. For instance, an engineering director may notice from the heatmap of the multidimensional output 422 that, within the timeframe represented by the exhaust data (e.g., the past ninety days), a disproportionate number of pull requests relating to the "bug/defect fix" and "maintenance and technical debt reduction" change types 426 are submitted by the "desktop" developer type 424.

Accordingly, the engineering director may deduce from the multidimensional output 422 that there exists a greater concentration of technical issues (e.g., bugs, defects, technical debt) in their desktop software products in relation to their other products (e.g., mobile apps). In response, the engineering director can engage with the desktop developers of their organization to investigate the causes of this potentially unexpected discrepancy. For instance, the organization can reference the multidimensional output 422 to plan future technical objectives and/or initiatives directed to reducing the amount of work required to address issues such as bugs and technical debt. In a specific example, the prevalence of technical debt reduction among the "desktop" developer type 424 may empower an associated product manager to advocate for longer development timelines that enable the organization to prioritize robust solutions over expedient ones. In this way, the organization can mitigate the need for future effort spent on addressing the inevitable issues caused by a rushed development cycle thereby improving both the quality of the end product and the efficiency of the organization.

Figure 5:
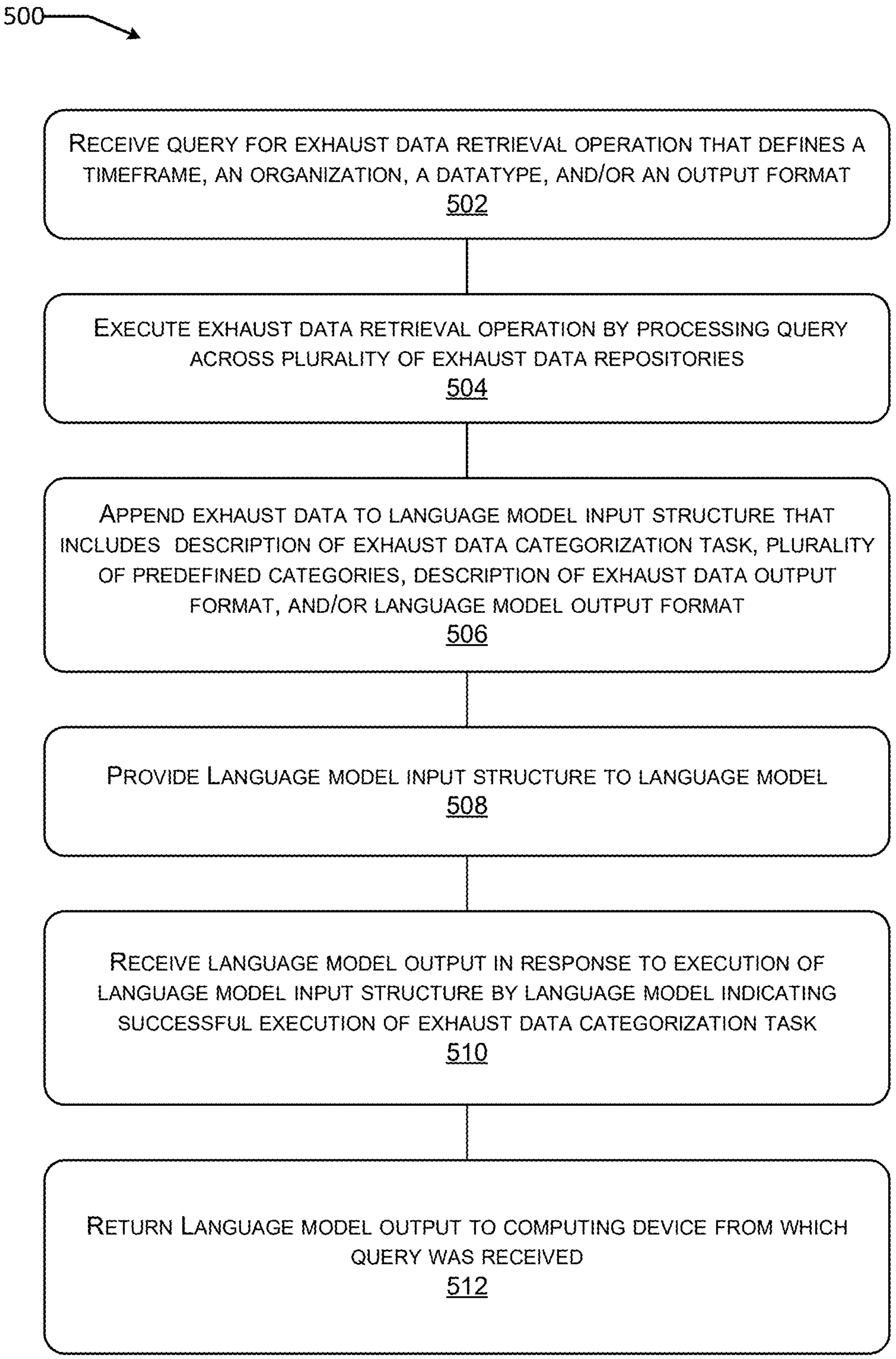
FIG. 5 is a flow diagram showing aspects of a process for implementing an exhaust data categorization task.

Turning now to FIG. 5, aspects of a process 500 for implementing an automated exhaust data categorization task are shown and described. With respect to FIG. 5, the process 500 begins at operation 502 where a system (e.g., a central management module) receives a query for an exhaust data retrieval operation. As described above, the query defines several parameters that control the exhaust data retrieval operation. These parameters can include a timeframe (e.g., the past ninety days), an organization (e.g., a department, a team, a product group), a data type (e.g., software engineering pull requests, human resources data), and/or an output format that specifies a text format to configure the retrieved exhaust data (e.g., single comma delimited lists, string truncation) to ensure efficient processing by downstream tools such as a language model.

Next, at operation 504, the system executes the exhaust data retrieval operation by processing the query across a plurality of exhaust data repositories. In various examples, these exhaust data repositories include software codebase repositories utilizing version control systems such as git, as well as a human resources database, an employee survey and evaluation database, and the like. It should be understood that while the examples discussed herein are directed to software engineering exhaust data (e.g., pull requests), the disclosed system can be utilized to categorize any suitable type of exhaust data.

Then, at operation 506, the system appends the retrieved exhaust data to a language model input structure. Moreover, the language model input structure includes a natural language description of the exhaust data categorization task, a plurality of predefined categories, a natural language description of the exhaust data output format, and/or a language model output format. Also known as a prompt, the language model input structure is an input to a language model (e.g., a small language model, a large language model, a multimodal language model) that causes the language model to perform a specified task. These inputs are typically in the form of a natural language instruction and/or statement (e.g., English). However, as described above, modern language models are non-deterministic, meaning that a language model may produce different outputs even when given the same input. As such, the language model input structure is specifically configured to mitigate inconsistencies through prompt engineering.

Subsequently, at operation 508, the system provides the language model input structure to a language model for execution. In various examples, the language model is an online model. That is, the language model is executed remotely at a different computing device (e.g., hosted in a cloud computing datacenter) than the computing device that receives and/or processes the exhaust data retrieval query. Accordingly, the language model input structure is transmitted over a network connection to the language model. Conversely, the language model may be an offline model, meaning that the language is executed at the same computing device that receives and/or processes the exhaust data retrieval query.

Next, at operation 510, the system receives a language model output in response to an execution of the language model input structure by the language model. Accordingly, receiving the language model output indicates a successful execution of the exhaust data categorization task.

Finally, at operation 512, the system returns the language model output to a computing device from which the exhaust data retrieval query was received. Stated another way, the system returns the language model output to a computing device that originally requested the exhaust data retrieval operation. As mentioned above, the language model output can be a text file that contains a plurality of categorization outputs. For example, an exhaust data categorization task for classifying individual software engineers into developer "types" (e.g., front-end, back-end) can have a language model output in which each row of the text file corresponds to an individual engineer.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can begin and/or end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein can be a dynamically linked library, a statically linked library, functionality produced by an application programing interface, a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
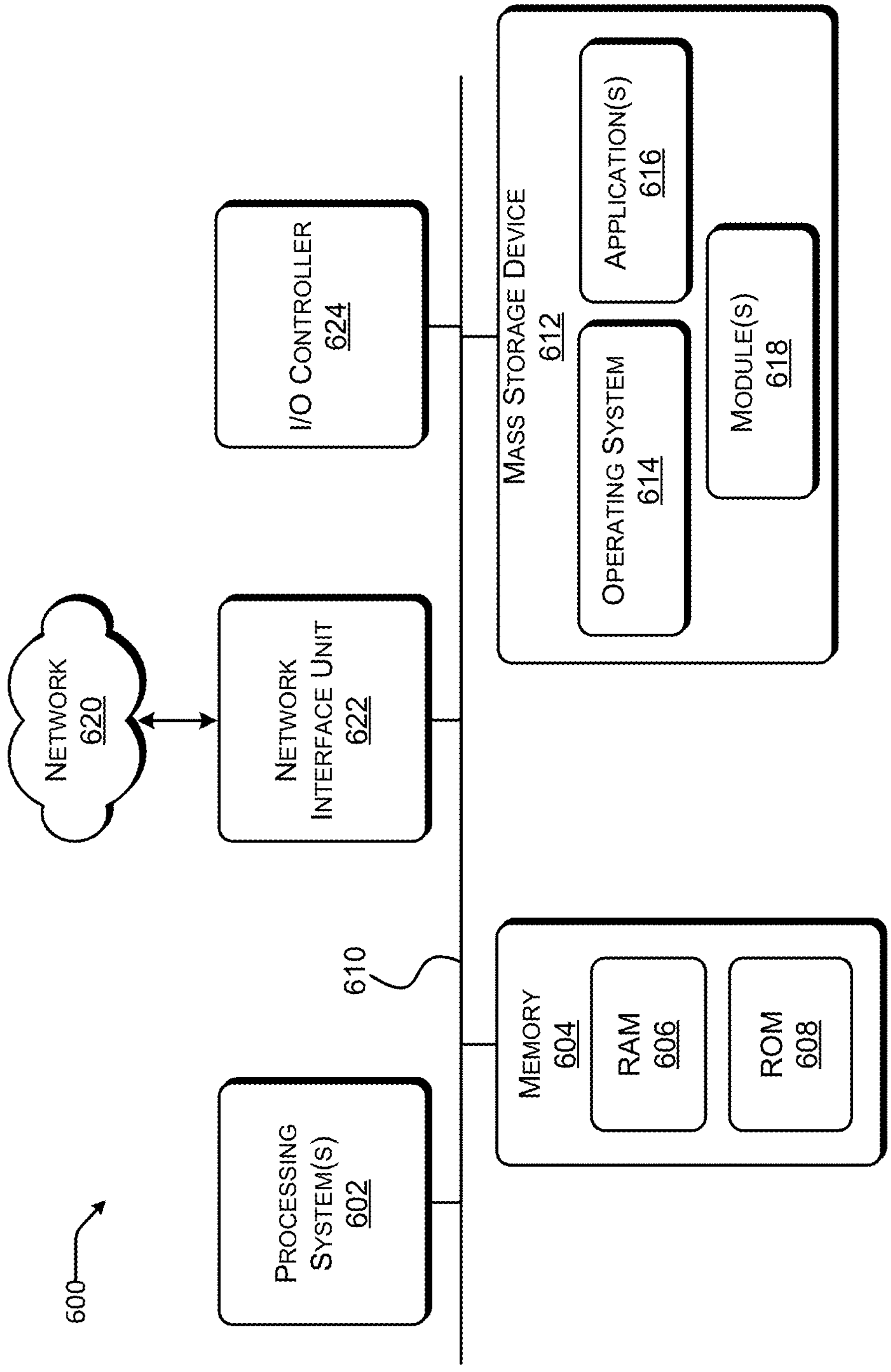
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of a volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

The disclosure presented herein also encompasses the subject matter set forth in the following clauses.

Example Clause A, a method for implementing an exhaust data categorization task, the method comprising: receiving a query for an exhaust data retrieval operation, wherein the query defines: a timeframe for the exhaust data retrieval operation; an organization associated with the exhaust data retrieval operation; a data type of the exhaust data retrieval operation; and an output format for the exhaust data retrieval operation; executing the exhaust data retrieval operation by processing the query across a plurality of exhaust data repositories, wherein executing the exhaust data retrieval operation produces exhaust data; appending the exhaust data to a language model input structure, wherein the language model input structure includes: a natural language description of the exhaust data categorization task; a plurality of predefined categories; a natural language description of the output format defined by the query for the exhaust data retrieval operation; and a language model output format for the exhaust data categorization task; providing the language model input structure with the appended exhaust data to a language model for execution; receiving a language model output in response to an execution of the language model input structure by a language model, the language model output indicating a successful execution of the exhaust data categorization task; and returning the language model output to a computing device from which the query for the exhaust data retrieval operation was received.

Example Clause B, the method of Example Clause A, wherein the language model input structure further includes an instruction for a confidence score associated with the exhaust data categorization task.

Example Clause C, the method of Example Clause A or Example Clause B, wherein: the language model output comprises a text file that includes a plurality of exhaust data categorization outputs; and an individual exhaust data categorization output includes: an alias associated with the individual data categorization output; a primary suggested category that is selected from the plurality of predefined categories included in the language model input structure; a natural language reasoning associated with the selection of the primary suggested category; and a confidence score associated with the selection of the primary suggested category.

Example Clause D, the method of any one of Example Clause A through C, wherein: the plurality of predefined categories is a first plurality of predefined categories; the language model input structure includes a second plurality of predefined categories; and the language model output is a multidimensional output comprising a first category selected from the first plurality of predefined categories and a second category selected from the second plurality of predefined categories.

Example Clause E, the method of any one of Example Clause A through D, wherein an individual category of the plurality of predefined categories includes a natural language description of the individual category.

Example Clause F, the method of any one of Example Clause A through E, wherein the exhaust data categorization task is a software engineering exhaust data categorization task.

Example Clause G, the method of Example Clause F, wherein the plurality of predefined categories comprises a plurality of developer types.

Example Clause H, the method of Example Clause F, wherein the plurality of predefined categories comprises a plurality of pull request change types.

Example Clause I, a system for implementing an exhaust data categorization task, the system comprising: a processing unit; and a computer-readable medium having encoded thereon, computer-readable instructions that, when executed by the processing unit, cause the processing unit to perform operations comprising: receiving a query for an exhaust data retrieval operation, wherein the query defines: a timeframe for the exhaust data retrieval operation; an organization associated with the exhaust data retrieval operation; a data type of the exhaust data retrieval operation; and an output format for the exhaust data retrieval operation; executing the exhaust data retrieval operation by processing the query across a plurality of exhaust data repositories, wherein executing the exhaust data retrieval operation produces exhaust data; appending the exhaust data to a language model input structure, wherein the language model input structure includes: a natural language description of the exhaust data categorization task; a plurality of predefined categories; a natural language description of the output format defined by the query for the exhaust data retrieval operation; and a language model output format for the exhaust data categorization task; providing the language model input structure with the appended exhaust data to a language model for execution; receiving a language model output in response to an execution of the language model input structure by a language model, the language model output indicating a successful execution of the exhaust data categorization task; and returning the language model output to a computing device from which the query for the exhaust data retrieval operation was received.

Example Clause J, the system of Example Clause I, wherein the language model input structure further includes an instruction for a confidence score associated with the exhaust data categorization task.

Example Clause K, the system of Example Clause I or Example Clause J, wherein: the language model output comprises a text file that includes a plurality of exhaust data categorization outputs; and an individual exhaust data categorization output includes: an alias associated with the individual data categorization output; a primary suggested category that is selected from the plurality of predefined categories included in the language model input structure; a natural language reasoning associated with the selection of the primary suggested category; and a confidence score associated with the selection of the primary suggested category.

Example Clause L, the system of any one of Example Clause I through K, wherein: the plurality of predefined categories is a first plurality of predefined categories; the language model input structure includes a second plurality of predefined categories; and the language model output is a multidimensional output comprising a first category selected from the first plurality of predefined categories and a second category selected from the second plurality of predefined categories.

Example Clause M, the system of any one of Example Clause I through L, wherein an individual category of the plurality of predefined categories includes a natural language description of the individual category.

Example Clause N, the system of any one of Example Clause I through M, wherein the exhaust data categorization task is a software engineering exhaust data categorization task.

Example Clause O, the system of Example Clause N, wherein the plurality of predefined categories comprises a plurality of developer types.

Example Clause P, the system of Example Clause N, wherein the plurality of predefined categories comprises a plurality of pull request change types.

Example Clause Q, a computer-readable storage medium for implementing an exhaust data categorization task, the computer-readable storage medium having encoded thereon, computer-readable instructions that, when executed by a system, cause the system to perform operations comprising: receiving a query for an exhaust data retrieval operation, wherein the query defines: a timeframe for the exhaust data retrieval operation; an organization associated with the exhaust data retrieval operation; a data type of the exhaust data retrieval operation; and an output format for the exhaust data retrieval operation; executing the exhaust data retrieval operation by processing the query across a plurality of exhaust data repositories, wherein executing the exhaust data retrieval operation produces exhaust data; appending the exhaust data to a language model input structure, wherein the language model input structure includes: a natural language description of the exhaust data categorization task; a plurality of predefined categories; a natural language description of the output format defined by the query for the exhaust data retrieval operation; and a language model output format for the exhaust data categorization task; providing the language model input structure with the appended exhaust data to a language model for execution; receiving a language model output in response to an execution of the language model input structure by a language model, the language model output indicating a successful execution of the exhaust data categorization task; and returning the language model output to a computing device from which the query for the exhaust data retrieval operation was received.

Example Clause R, the computer-readable storage medium of Example Clause Q, wherein the language model input structure further includes an instruction for a confidence score associated with the exhaust data categorization task.

Example Clause S, the computer-readable storage medium of Example Clause Q or Example Clause R, wherein: the language model output comprises a text file that includes a plurality of exhaust data categorization outputs; and an individual exhaust data categorization output includes: an alias associated with the individual data categorization output; a primary suggested category that is selected from the plurality of predefined categories included in the language model input structure; a natural language reasoning associated with the selection of the primary suggested category; and a confidence score associated with the selection of the primary suggested category.

Example Clause T, the computer-readable storage medium of any one of Example Clause Q through S, wherein an individual category of the plurality of predefined categories includes a natural language description of the individual category.

Conditional language such as, among others, "can," "could," "might" or "may," unless specifically stated otherwise, are understood within the context to present that certain examples include, while other examples do not include, certain features, elements, and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second"

within the Summary, Detailed Description, and/or claims may be used to distinguish between two different instances of the same element.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for implementing an exhaust data categorization task, the method comprising:

receiving a query for an exhaust data retrieval operation, wherein the query defines:

a timeframe for the exhaust data retrieval operation;

an organization associated with the exhaust data retrieval operation;

a data type of the exhaust data retrieval operation; and an output format for the exhaust data retrieval operation;

executing the exhaust data retrieval operation by processing the query across a plurality of exhaust data repositories, wherein executing the exhaust data retrieval operation produces exhaust data;

appending the exhaust data to a language model input structure, wherein the language model input structure includes:

a natural language description of the exhaust data categorization task;

a plurality of predefined categories;

a natural language description of the output format defined by the query for the exhaust data retrieval operation; and a language model output format for the exhaust data categorization task;

providing the language model input structure with the appended exhaust data to a language model for execution;

receiving a language model output in response to an execution of the language model input structure by the language model, the language model output indicating a successful execution of the exhaust data categorization task; and returning the language model output to a computing device from which the query for the exhaust data retrieval operation was received.

2. The method of claim 1, wherein the language model input structure further includes an instruction for a confidence score associated with the exhaust data categorization task.

3. The method of claim 1, wherein:

the language model output comprises a text file that includes a plurality of exhaust data categorization outputs; and an individual exhaust data categorization output includes:

an alias associated with the individual data categorization output;

a primary suggested category that is selected from the plurality of predefined categories included in the language model input structure;

a natural language reasoning associated with the selection of the primary suggested category; and a confidence score associated with the selection of the primary suggested category.

4. The method of claim 1, wherein:

the plurality of predefined categories is a first plurality of predefined categories;

the language model input structure includes a second plurality of predefined categories; and the language model output is a multidimensional output comprising a first category selected from the first plurality of predefined categories and a second category selected from the second plurality of predefined categories.

5. The method of claim 1, wherein an individual category of the plurality of predefined categories includes a natural language description of the individual category.

6. The method of claim 1, wherein the exhaust data categorization task is a software engineering exhaust data categorization task.

7. The method of claim 6, wherein the plurality of predefined categories comprises a plurality of developer types.

8. The method of claim 6, wherein the plurality of predefined categories comprises a plurality of pull request change types.

9. A system for implementing an exhaust data categorization task, the system comprising:

a hardware processing unit; and a computer-readable medium having encoded thereon, computer-readable instructions that, when executed by the hardware processing unit, cause the hardware processing unit to perform operations comprising:

receiving a query for an exhaust data retrieval operation, wherein the query defines:

a timeframe for the exhaust data retrieval operation;

an organization associated with the exhaust data retrieval operation;

a data type of the exhaust data retrieval operation; and an output format for the exhaust data retrieval operation;

executing the exhaust data retrieval operation by processing the query across a plurality of exhaust data repositories, wherein executing the exhaust data retrieval operation produces exhaust data;

appending the exhaust data to a language model input structure, wherein the language model input structure includes:

a natural language description of the exhaust data categorization task;

a plurality of predefined categories;

a natural language description of the output format defined by the query for the exhaust data retrieval operation; and a language model output format for the exhaust data categorization task;

providing the language model input structure with the appended exhaust data to a language model for execution;

receiving a language model output in response to an execution of the language model input structure by the language model, the language model output indicating a successful execution of the exhaust data categorization task; and returning the language model output to a computing device from which the query for the exhaust data retrieval operation was received.

10. The system of claim 9, wherein the language model input structure further includes an instruction for a confidence score associated with the exhaust data categorization task.

11. The system of claim 9, wherein:
the language model output comprises a text file that includes a plurality of exhaust data categorization outputs; and
an individual exhaust data categorization output includes:
an alias associated with the individual data categorization output;
a primary suggested category that is selected from the plurality of predefined categories included in the language model input structure;
a natural language reasoning associated with the selection of the primary suggested category; and
a confidence score associated with the selection of the primary suggested category.

12. The system of claim 9, wherein:
the plurality of predefined categories is a first plurality of predefined categories;
the language model input structure includes a second plurality of predefined categories; and
the language model output is a multidimensional output comprising a first category selected from the first plurality of predefined categories and a second category selected from the second plurality of predefined categories.

13. The system of claim 9, wherein an individual category of the plurality of predefined categories includes a natural language description of the individual category.

14. The system of claim 9, wherein the exhaust data categorization task is a software engineering exhaust data categorization task.

15. The system of claim 14, wherein the plurality of predefined categories comprises a plurality of developer types.

16. The system of claim 14, wherein the plurality of predefined categories comprises a plurality of pull request change types.

17. A computer-readable storage medium for implementing an exhaust data categorization task, the computer-readable storage medium having encoded thereon, computer-readable instructions that, when executed by a system, cause the system to perform operations comprising:
receiving a query for an exhaust data retrieval operation, wherein the query defines:
a timeframe for the exhaust data retrieval operation;
an organization associated with the exhaust data retrieval operation;
a data type of the exhaust data retrieval operation; and
an output format for the exhaust data retrieval operation;
executing the exhaust data retrieval operation by processing the query across a plurality of exhaust data repositories, wherein executing the exhaust data retrieval operation produces exhaust data;
appending the exhaust data to a language model input structure, wherein the language model input structure includes:
a natural language description of the exhaust data categorization task;
a plurality of predefined categories;
a natural language description of the output format defined by the query for the exhaust data retrieval operation; and
a language model output format for the exhaust data categorization task;
providing the language model input structure with the appended exhaust data to a language model for execution;
receiving a language model output in response to an execution of the language model input structure by the language model, the language model output indicating a successful execution of the exhaust data categorization task; and
returning the language model output to a computing device from which the query for the exhaust data retrieval operation was received.

18. The computer-readable storage medium of claim 17, wherein the language model input structure further includes an instruction for a confidence score associated with the exhaust data categorization task.

19. The computer-readable storage medium of claim 17, wherein:
the language model output comprises a text file that includes a plurality of exhaust data categorization outputs; and
an individual exhaust data categorization output includes:
an alias associated with the individual data categorization output;
a primary suggested category that is selected from the plurality of predefined categories included in the language model input structure;
a natural language reasoning associated with the selection of the primary suggested category; and
a confidence score associated with the selection of the primary suggested category.

20. The computer-readable storage medium of claim 17, wherein an individual category of the plurality of predefined categories includes a natural language description of the individual category.

* * * * *